(12) United States Patent
Hosokawa et al.

(10) Patent No.: US 8,682,150 B2
(45) Date of Patent: Mar. 25, 2014

(54) LENS DRIVING APPARATUS

(75) Inventors: Masahiro Hosokawa, Tokyo (JP);
Shusuke Ichihashi, Tokyo (JP);
Noriyuki Kawano, Tokyo (JP)

(73) Assignee: TDK Corporation, Tokyo (JP)

( * ) Notice: Subject to any disclaimer, the term of this patent is extended or adjusted under 35 U.S.C. 154(b) by 97 days.

(21) Appl. No.: 13/112,813

(22) Filed: May 20, 2011

(65) Prior Publication Data
US 2011/0286732 A1    Nov. 24, 2011

(30) Foreign Application Priority Data

May 21, 2010 (JP) ................................ 2010-117590

(51) Int. Cl.
*G03B 17/00* (2006.01)
(52) U.S. Cl.
USPC ........................................ 396/55; 348/208.11
(58) Field of Classification Search
USPC ........................................ 396/55; 348/208.11
See application file for complete search history.

(56) References Cited

U.S. PATENT DOCUMENTS

| | | | | |
|---|---|---|---|---|
| 5,883,742 | A * | 3/1999 | Kamata | ........................ 359/557 |
| 2010/0079604 | A1 | 4/2010 | Washisu | |
| 2010/0102127 | A1 * | 4/2010 | Bonnet et al. | ................. 235/439 |
| 2011/0067905 | A1 * | 3/2011 | Su et al. | ........................ 174/254 |
| 2011/0096178 | A1 * | 4/2011 | Ryu et al. | ................... 348/208.2 |
| 2011/0097062 | A1 | 4/2011 | Tsuruta et al. | |
| 2011/0114370 | A1 * | 5/2011 | Wang | ............................. 174/254 |
| 2011/0217029 | A1 * | 9/2011 | Wu et al. | ......................... 396/55 |
| 2011/0247863 | A1 * | 10/2011 | Watanabe | ..................... 174/254 |

FOREIGN PATENT DOCUMENTS

| | | | |
|---|---|---|---|
| JP | 2007-41419 | | 2/2007 |
| JP | 2007041419 | A * | 2/2007 |
| JP | 2007-93953 | | 4/2007 |
| JP | 2007-293125 | | 11/2007 |
| JP | 2008-89995 | | 4/2008 |
| JP | 2009-288770 | | 12/2009 |
| JP | 2010-85471 | | 4/2010 |

* cited by examiner

*Primary Examiner* — Clayton E Laballe
*Assistant Examiner* — Linda B Smith
(74) *Attorney, Agent, or Firm* — Muncy, Geissler, Olds & Lowe, P.C.

(57) ABSTRACT

A lens driving apparatus has a lens portion 21, a first driving portion 36 and 37 to cause a movement of a movable unit 20 including said lens portion 21 relatively to a fixed portion 10 along a vertical direction of a light axis of said lens portion 21, a second driving portion 23 and 26 to cause a movement of said lens portion relatively to said fixed portion 10 along said light axis, an image sensor 11 held on said fixed portion 10 to detect a light which comes through said lens portion 21, an inner casing 28a held on said fixed portion 10 to cover said movable unit 20 and said image sensor 11, and a planar flexible printed circuit 50 to which a shake detection sensor 58 detecting a shake of said fixed portion 10 is connected. The planar flexible printed circuit 50 is attached to contact with a sidewall surface of said inner casing 28a parallel to the light axis of said lens.

8 Claims, 8 Drawing Sheets

LENS DRIVING APPARATUS

BACKGROUND OF THE INVENTION

1. Field of the Invention

The present invention relates to a lens driving apparatus used for, for example, a camera module of mobile phone and the like.

2. Description of the Related Art

For a lens driving apparatus preferably used for a camera module of a mobile phone and the like, it is configured that a whole movable unit including a lens portion and an image sensor moves with respect to a fixed portion, in order to downsize the apparatus with having a mechanism of shake correction (Japanese Patent Publication No: 2009-288770).

However, this conventional lens driving apparatus needs to connect a movable unit and a fixed portion by planar flexible printed circuit (FPC), in order to retrieve image data from a movable unit. Therefore, a movement of movable unit against a fixed portion for shake correction is restricted by FPC, and it needs improvement in shake correction with high accuracy.

Moreover, a conventional configuration might generate a noise due to bending or extending of the FCP in response to the movement of movable unit against a fixed portion for shake correction. In addition, it needs improvement in assembling apparatus in order to connect between a movable unit and a fixed portion by FPC.

SUMMARY OF THE INVENTION

The present invention has been made by considering this real scene, a purpose of the invention is to provide a lens driving apparatus which enables downsizing the apparatus and assembling it easier, while it makes possible a shake correction with high accuracy.

In order to achieve the above purpose, a lens driving apparatus according to the present invention comprises a lens portion having at least one lens, a first driving portion to cause a movement of a movable unit including said lens portion relatively to a fixed portion along a vertical direction of a light axis of said lens portion, a second driving portion to cause a movement of said lens portion relatively to said fixed portion along said light axis, and an image sensor held on said fixed portion to detect a light which comes through said lens portion, wherein a shake detection sensor detecting a shake of said fixed portion is arranged on said fixed portion.

Because a lens driving apparatus according to the present invention comprises the first driving portion to cause a movement of the lens portion along the vertical direction of the light axis and the second driving portion to cause a movement of the lens portion along the light axis, the lens portion can serve as a lens for both focus adjusting and shake correction. Therefore, the lens driving apparatus according to the present invention can realize a small size and multi functional lens driving apparatus and is especially suitable for a camera of mobile phone.

Moreover, for a lens driving apparatus according to the present invention, an image sensor is not attached to a movable unit and is held on a fixed portion. Therefore, in this invention, it is not necessary to transmit and receive an image signal by connecting a movable unit and a fixed unit by planar flexible printed circuit (hereinafter called "FPC").

For this reason, a movement of a movable unit against a fixed portion for shake correction will not be restricted by FPC and can realize a shake correction with high accuracy.

Further, in this invention, FPC is applied to contact with the sidewall surface parallel to the light axis of lens in a casing which is arranged on a fixed portion. Therefore, FPC does not bend and extend in response to a movement of the movable unit and is less likely to generate a noise. In addition, there is no need to connect between a movable unit and a fixed portion by FPC and it enables assembling the apparatus easier.

Preferably, a control integrated circuit for shake control is held on said fixed portion. The control integrated circuit is also held on the fixed portion along with a shake detection sensor, and it has an advantage that it becomes easier to connect the shake detection sensor and the control integrated circuit.

Preferably, the lens driving apparatus of the present invention further comprises a casing held on said fixed portion to cover said movable unit and the image sensor, and a planar flexible printed circuit to which the shake detection sensor detecting a shake of said fixed portion is connected, the planar flexible printed circuit being attached to contact with a sidewall surface of said casing parallel to the light axis of said lens.

Due to attaching the shake detection sensor to FPC and attaching FPC to sidewall surface of the casing, a vibration in response to a movement of the movable unit is hardly transmitted to the shake detection sensor and that enables the shake detection sensor to detect a shake with high accuracy. In this respect, a shake correction with high accuracy can be realized. Moreover, due to attaching FPC along to sidewall surface of the casing, it becomes possible to downsize the apparatus.

Said flexible printed circuits may comprise a first terminal electrically connecting to an image sensor base plate which configures a part of said fixed portion with supporting said image sensor. It becomes easier to connect the flexible printed circuit and the image sensor base plate through the first terminal. The image sensor base plate may include a connector which connects the image sensor and an external circuit and may also include a driving circuit to control the second driving portion.

Said first driving portion may comprise a first driving coil applying a driving force to a first magnet, and said flexible printed circuits may comprise a second terminal electrically connecting to a fixed circuit board which is a part of said fixed portion with supporting said first driving coil. It becomes easier to connect the flexible printed circuit and the fixed circuit board through the second terminal. On the fixed circuit board, it may arrange a wiring which transmits a driving signal to the first driving coil of said first driving portion and may also arrange a wiring of sensor which detects a movement of said movable unit.

Said second driving portion may comprise a second driving coil applying a driving force to a second magnet, said second magnet may be held on a magnet holding member of said movable unit, said second driving coil may be held on a coil holder of said movable unit, said lens portion may be held on said coil holder, said magnet holding member and coil holder may be connected by a thin-plate spring, and said coil holder may be supported to allow a free movement to the light axis direction against said magnet holding member.

Said first magnet may be arranged on the magnet holding member of said movable unit and said first driving coil may be arranged on said fixed circuit board. By configuring like this, it enables to easily cause a movement of the lens portion to the fixed portion both along a direction of light axis and along a vertical direction of light axis, with a compact device configuration.

The magnet holding plate arranged between the first magnet and the second magnet may shutoff magnetism between the first magnet and the second magnet and may be configured so that the interference of respective magnetic field is prevented. Therefore, the lens driving apparatus including the magnet holding plate like this enables to drive the lens portion with high accuracy.

Moreover, for example, said magnet holding plate may comprise a ring shape wherein the circumference is substantially rectangular, said first magnet may be configured with four rod-like magnets which are arranged at positions corresponding to respective sides of said magnet holding plate viewing from a direction of said light axis, said second magnet may be configured with four individual pieces of magnets arranged at positions corresponding to respective corners of said magnet holding plate viewing from a direction of said light axis.

By configuring the first magnet with the rod-like magnets arranged at positions corresponding to respective sides of the magnet holding plate, the first driving portion becomes possible to generate a larger driving force. Compared to this, by configuring the second magnet with the individual pieces of magnets arranged at positions corresponding to respective corners of said magnet holding plate, a lens supporting device enables to include a larger diameter lens. Therefore, the lens driving apparatus like this is more suitable for downsizing.

Said flexible printed circuits may be attached along with more than two adjacent sidewall surfaces of said casing. Said flexible printed circuits may comprise a first lateral surface on which said shake detection sensor is attached and a second lateral surface on which the control integrated circuit is attached, the second lateral surface being continuously formed with the first lateral surface to enable a folding against said first lateral surface, and each said first lateral surface and said second lateral surface may be attached to the two adjacent sidewall surfaces of said casing.

Said flexible printed circuits may further comprise a third lateral surface which is continuously formed with the first lateral surface to enable a folding against said first lateral surface, at the opposite side of the connection between said first lateral surface and said second lateral surface. Said second terminal may be formed on this third lateral surface. By configuring like this, it becomes easier to connect the flexible printed circuit and the fixed circuit board and also to connect the movable circuit board and the image sensor board, with the improvement of downsizing of apparatus.

Said movable unit may be attached to allow a movement relatively to said fixed portion along the vertical direction of said light axis by at least three wire members, preferably by four wire members, and said movable unit may include the second driving portion. Moreover, a driving power may be supplied to the second driving portion of said movable unit through at least one of said wire members.

By configuring like this, there is no necessity to further establish wires to supply the driving power to the second driving portion, and the movement limitation of movable unit by wires which is for the movable unit comprising the second driving portion is eliminated, with the improvement of downsizing the apparatus. Due to this, it enables an accurate movement control of the movable unit and also enables a shake correction with high accuracy.

BRIEF DESCRIPTION OF THE DRAWINGS

The following explanation regarding this invention is based on the embodiments shown in Figures. The Figures are.

DESCRIPTION OF THE PREFERRED EMBODIMENTS

The following explanation regarding this invention is based on the embodiments shown in Figures.

Figure 1:
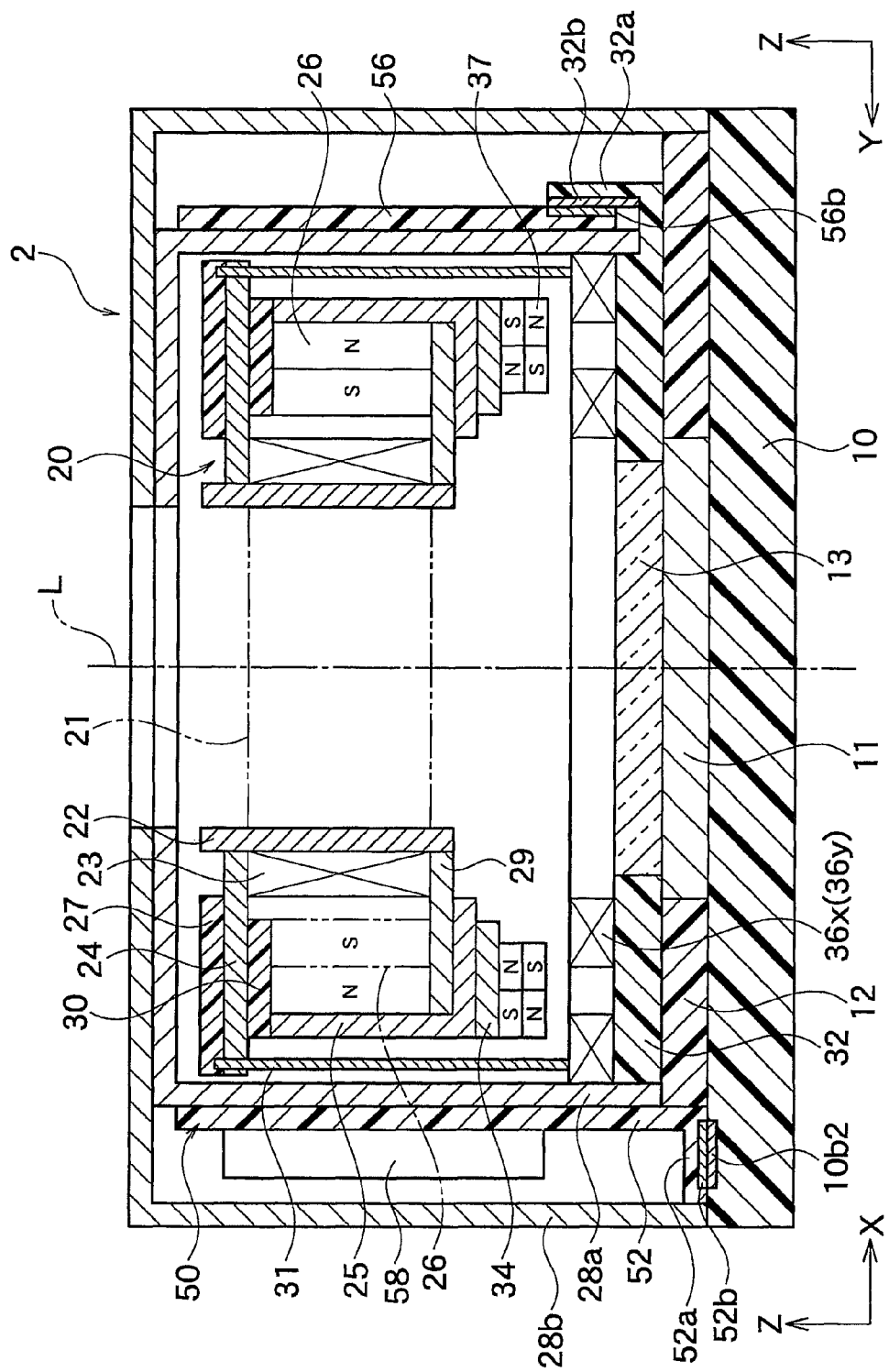
FIG. 1 is a cross sectional view of a lens driving apparatus according to one embodiment of the present invention.
Figure 2:
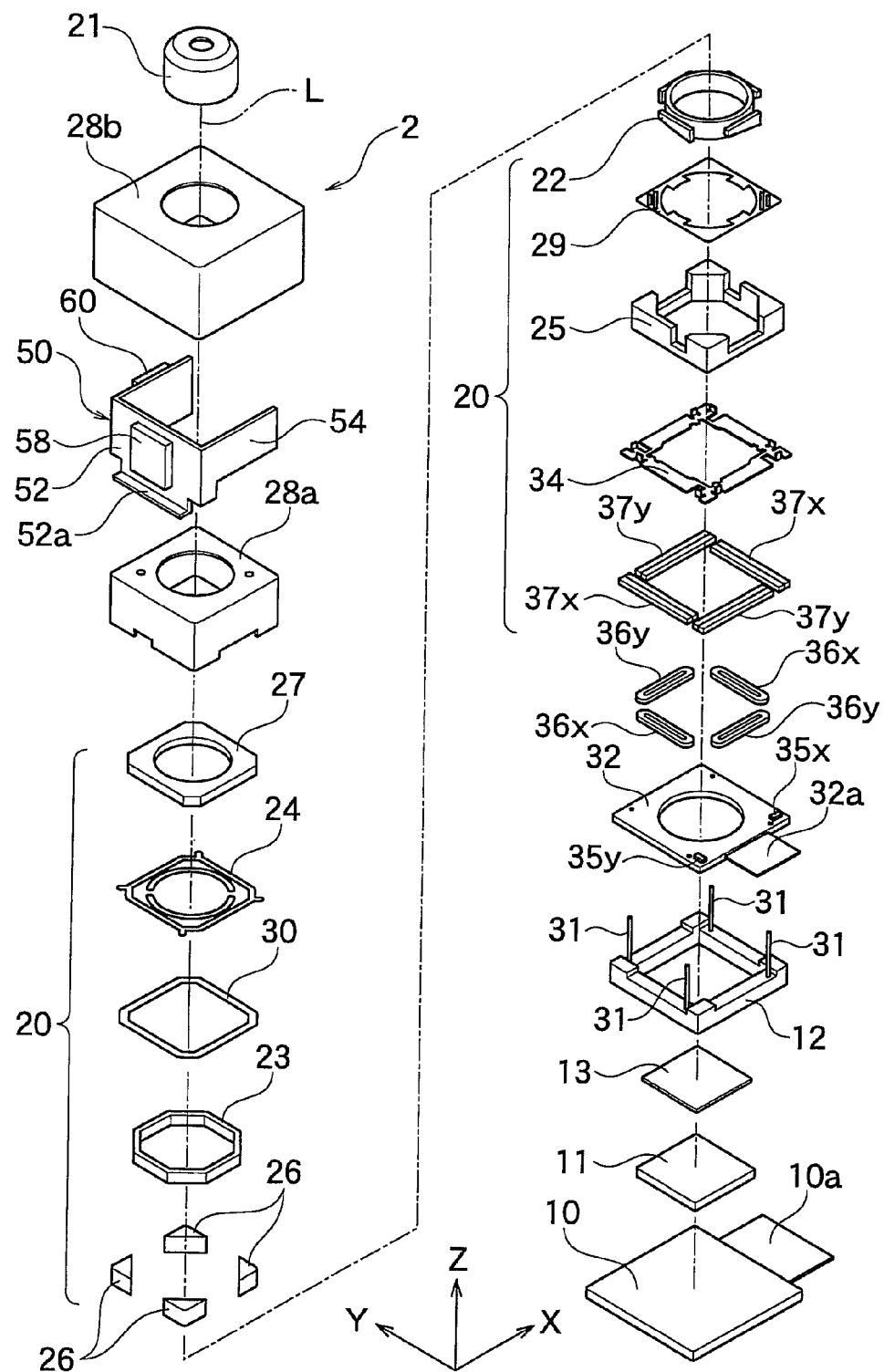
FIG. 2 is a whole disassembled perspective view of the lens driving apparatus shown in FIG. 1.

As shown in FIGS. 1 and 2, a camera unit 2 having a lens driving apparatus according to one embodiment of the present invention comprises an image sensor base plate 10 on which an image sensor 11 is fixed and a movable unit 20 supporting a lens portion 21 which guides a subject light to the image sensor 11.

Note that, in the following explanation and Figures, it will be specified that along a direction of a light axis L of the lens portion 21, a direction from the image sensor 11 to the lens portion 21 is defined as a positive direction of Z-axis, and a vertical direction to the light axis L of the lens portion 21 are defined as X-axis direction and Y axis direction. In addition, the X-axis, Y-axis and Z-axis are vertical each other. Moreover, especially in FIG. 1, a cross sectional view of a left side of the light axis L shows a cross sectional view of the X-Z axis in FIG. 2, and a cross sectional view of a right side of the light axis L shows a cross sectional view of the Y-Z axis in FIG. 2.

On the surface of the image sensor base plate 10 in the Z-axis direction which is as a fixed portion, the image sensor 11 and a filter 13 are fixed and it configures an image taking element unit 46. On the surface of the base plate 10 in the Z-axis direction, around the image sensor 11, a bracket 12 is provided and the bracket 12 is fixed on the base plate 10.

Figure 3:
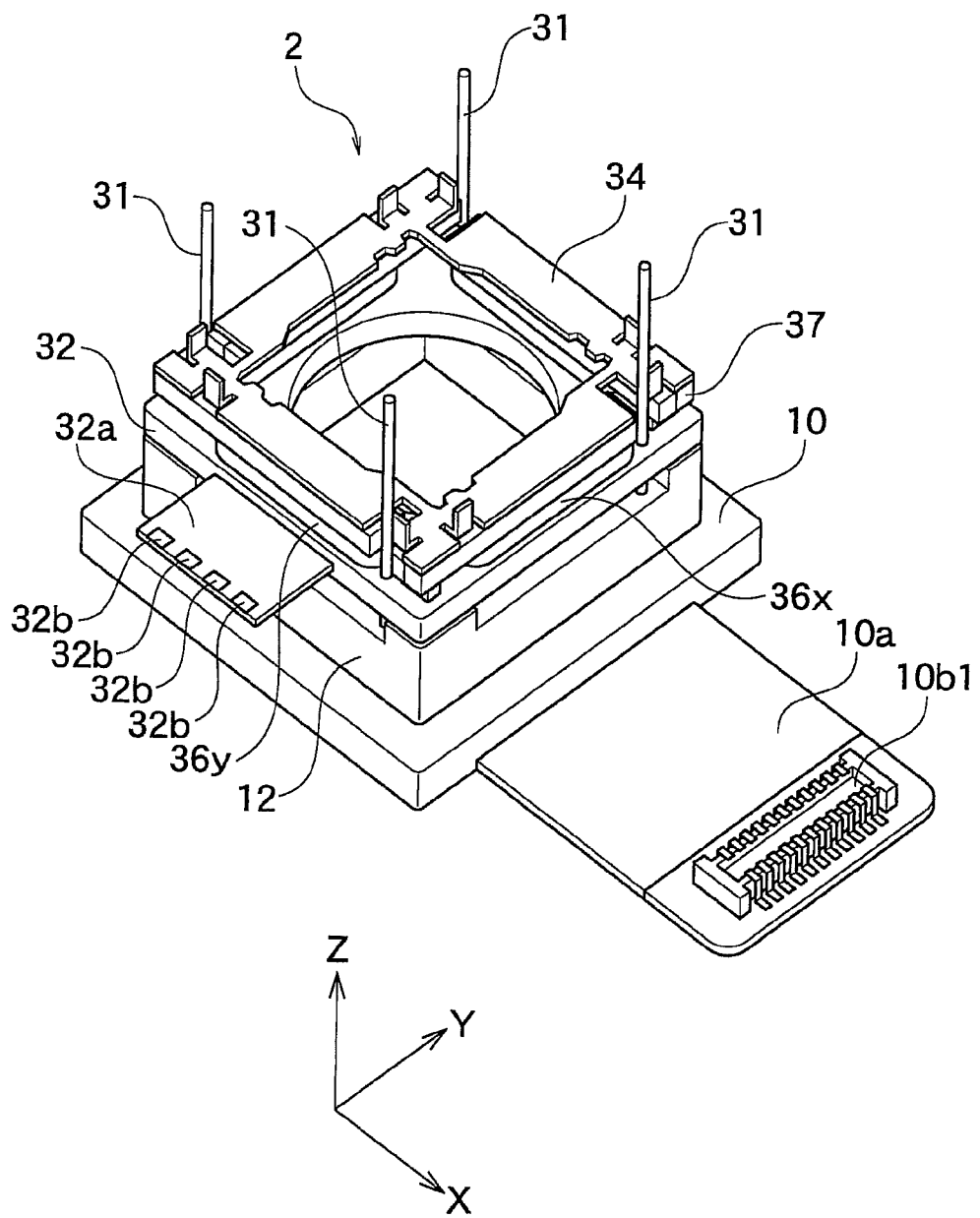
FIG. 3 is an assembly perspective view showing a part of the lens driving apparatus shown in FIGS. 1 and 2.

As shown in FIG. 3, on the base plate 10, a wiring board 10a is connected along the X-axis direction and a connector 10b1 is attached on a tip end of the wiring board 10a. The connector 10b1 is, for example, for connecting the image sensor 11 shown in FIG. 1 and an external circuit, and an image data which is output from the image sensor 11 can be retrieved from there. Moreover, the connector 10b1 can be connected to other electric circuits and electric components existing in the camera unit 2.

The image sensor shown in FIGS. 1 and 2 is configured by a solid image taking element such as CCD, CMOS and the like, and it generates an image signal by photoelectric conversion. A light receiving surface of the image sensor 11 is protected by the bracket 12 and the filter 13. A rectangular shaped through hole is formed on the bracket 12 so as to pass through an image light.

A lower end of wire member 31, which supports to allow a free movement of the movable unit 20 shown in FIG. 1 to the X-Y axis direction, is fixed on four corners of the bracket 12. An upper end of four wire member 31 is fixed on a cap 27 of the movable unit 20, as shown in FIG. 1. However, it may be fixed not only on the cap 27 but also on other members that configure the movable unit 20.

The wire member 31 has an elasticity and enables an elastic bending deformation with having the bracket 12 as a fixed end, and it is supported to allow a free movement of the movable unit 20 to the X-Y axis direction against the base plate 10 as a fixed portion. Although a material for the wire member 31 is not particularly limited, phosphor bronze is preferable. The number of the wire member 31 is preferably 3 or more, or further preferably 4, in order to support the movable unit 20 against the bracket 12 in a balanced manner. However, it may be 5 or more.

By making a cross sectional shape of the wire member 31 in a circular shape or a substantially circular shape which is close to the circular shape such as polygonal shape and the like, the rigidity of the wire member 31 becomes substantially uniform with respect to a rotating direction whose center is an axis of the wire member, it becomes easy to move the movable unit 20 smoothly to an arbitrary direction of X-Y axis direction.

In this embodiment, an upper end of at least one wire member 31 of the four wires is electrically connected to a F-spring 24 having a conductive characteristic as will hereinafter be described. The F-spring 24 is electrically connected to an AF coil 23 also as will hereinafter be described. A lower end of the wire member 31 is electrically connected to a circuit board 32 or the image sensor base plate 10, and the wire member 31 and the F-spring 24 serve as conductive wires to AF coil 23.

It is preferred that the F-spring 24 is electrically divided in two. One end of the AF coil 23 is electrically connected to one side of the divided F-spring 24, and is electrically connected to one end of a suspension wire 31 through one side of the F-spring 24. Compared to this, the other end of the AF coil 23 is electrically connected to the other side of the divided F-spring 24, and is electrically connected through the other side of the F-spring 24 to one end of other suspension wire member 31 which is different from the suspension wire member 31 connected to the AF coil 23.

As shown in FIGS. 1 and 2, the circuit board 32 is fixed on the bracket 12. On the circuit board 32, a X-direction position sensor 35x and a Y-direction position sensor 35y are provided. The X-direction position sensor 35x and Y-direction position sensor 35y detect a relative position in X-Y axis direction of the movable unit 20 to the base plate 10 as a fixed portion.

Figure 5:
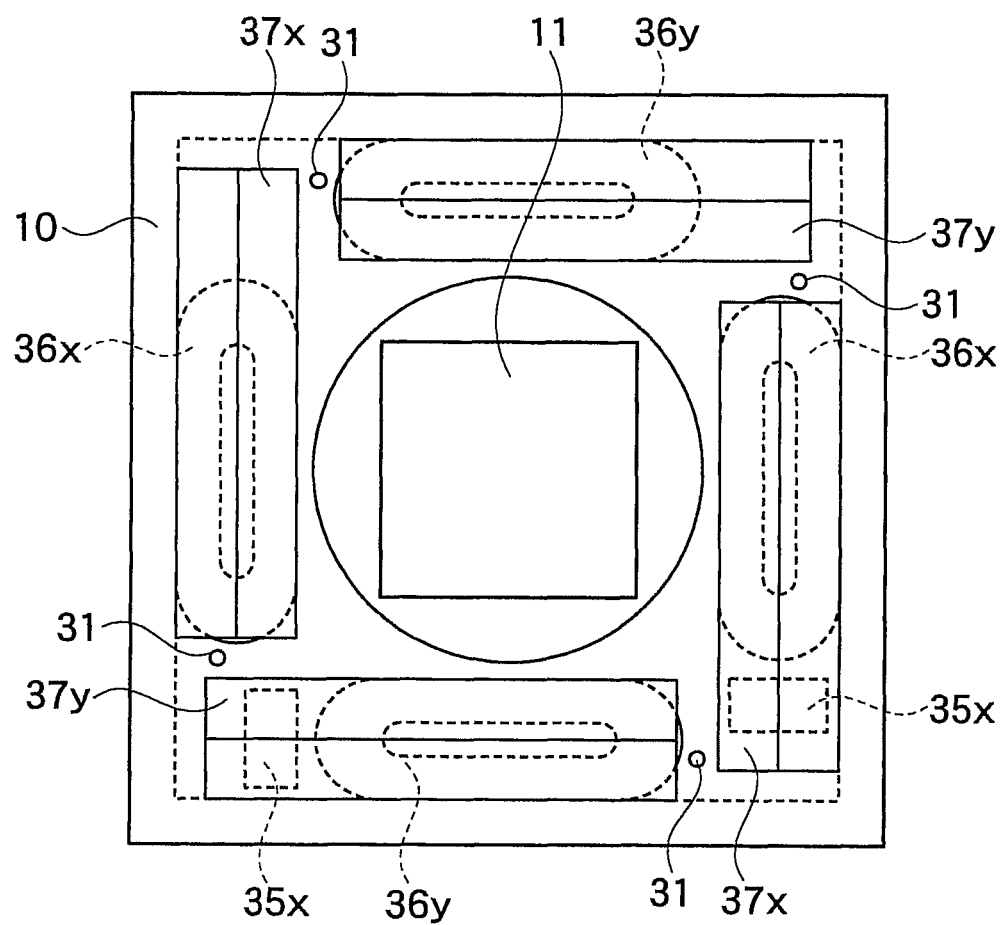
FIG. 5 is a view that the assembly perspective view shown in FIG. 3 is viewed from above, it abbreviates some components, and is a schematic plane view explaining a constitution of the shake correction voice coil motor.

The X-direction position sensor 35x and Y-direction position sensor 35y are configured with, for example, a hall element and the like. As shown in FIG. 5, the X-direction position sensor 35x and the Y-direction position sensor 35y detects a magnetic field variation caused by a movement of a X-direction shake correction magnet (first magnet) 37x and a Y-direction shake correction magnet (first magnet) 37y which are attached to the movable unit 20, and performs a position detecting for the movable unit 20 in the X-Y axis direction.

As shown in FIGS. 1 and 2, on the circuit board 32, a X-direction shake correction coil (first coil) 36x and a Y-direction shake correction coil (first coil) 36y are fixed, and wires for supplying a driving signal to these coils are mounted. On the circuit board 32, a distributing cable 132a is connected along the Y-axis direction, a joining terminal 32b is formed on a tip end of the distributing cable 32a, from which a driving signal for a coil 36x and a coil 36y is input, and an output signal from the sensors 35x and 35y are retrieved.

Figure 4:
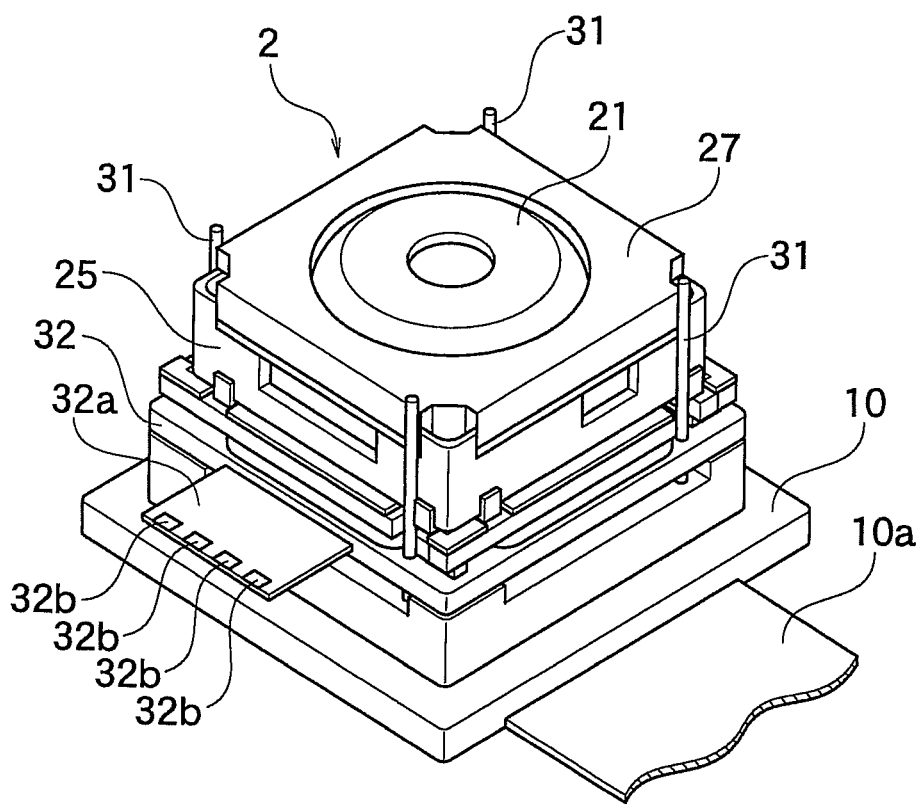
FIG. 4 is an assembly perspective view showing a part of the lens driving apparatus shown in FIGS. 1 and 2, and also is an assembly perspective view which further assembles components on the components shown in FIG. 3.
Figure 6:
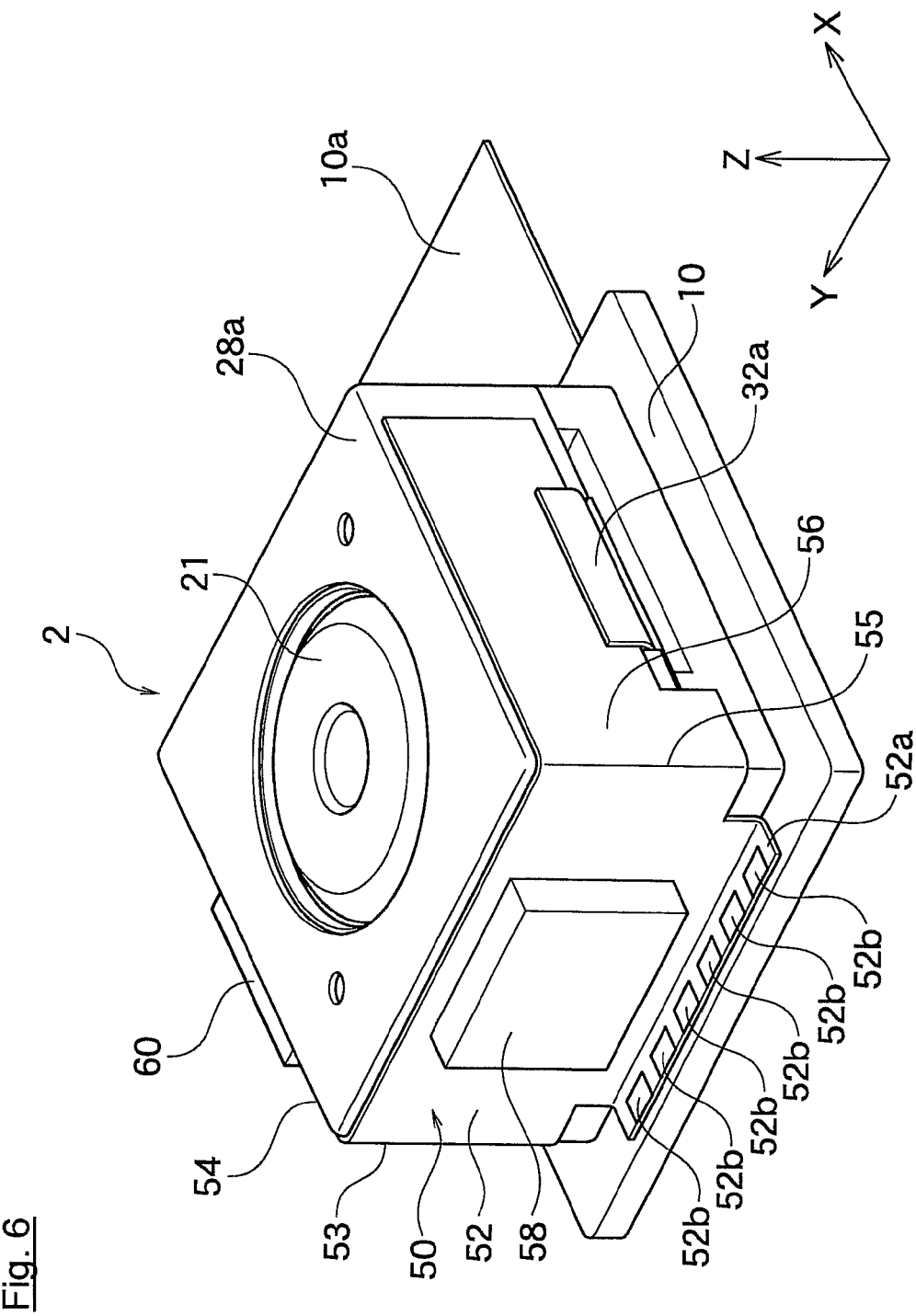
FIG. 6 is an assembly perspective view showing a part of the lens driving apparatus shown in FIGS. 1 and 2, and also is an assembly perspective vies which further assembles components on the components shown in FIG. 4.

The cable 32a as shown in FIG. 2 is folded as shown in FIGS. 1 and 6, from the state shown in FIGS. 3 and 4, and is electrically connected to a second terminal formed below the outer surface of a third lateral surface 56 of a planar flexible printed circuit as will hereinafter be described. The planar flexible printed circuit is described below.

As shown in FIGS. 1 and 2, a pair of the X-direction shake correction magnet 37y is provided through a predetermined space above the X-direction shake correction coil 36x respectively fixed along two sides which are opposite side of the circuit board 32 at fixed side. Similarly, a pair of Y-direction shake correction magnet 37y is provided through a predetermined space above the Y-direction shake correction coil 36y respectively fixed along two sides which are opposite side of the circuit board 32 at fixed side.

Theses compensation magnets 37x and 37y are fixed at a lower surface of four sides position of a magnet holding plate 34 which is fixed at lower end of the movable unit 20. Theses compensation magnets 37x and 37y, and the compensation coil 36x and 36y configure a shake correction voice coil motor, and a shake correction control is performed by moving the whole movable unit 20 to the X-Y axis direction against the base plate 10 as a fixed portion.

More specifically, as shown in FIG. 5, these compensation magnets 37x and 37y and also the compensation coil 36x and 36y are corresponding each other. A driving force (electromagnetic force) in the X-Y axis direction affects on the magnets 37x and 37y by applying a driving electrical current to the coil 36x and 36y and the movable unit 20 shown in FIG. 1 can be moved to the X-Y axis direction.

As shown in FIG. 1, the magnet holding plate 34 is held on the movable unit 20 and it is fixed on the undersurface of a magnet holding member 25 in this embodiment. The magnet holding plate 34 is configured with a magnetic body, for example iron, stainless and the like. In this embodiment, the magnet holding plate 34 comprises a ring shape wherein the circumference is substantially rectangular. Moreover, the magnet 37x and 37y (first magnet) included in the shake correction voice coil motor are configured with a rod-like magnet, and the respective magnets 37x and 37y are provided at positions corresponding to respective sides of the magnet holding plate 34.

In the movable unit 20, the magnet holding member 25 comprises a ring shape wherein the circumference is substantially rectangular and pillar sections respectively projecting upward are formed on four corners, and AF magnets (second magnet) 26 are fixed on the inside of each pillar section. In the magnet holding member 25, the outer circumferential portion of F-spring 24 and 29 are fixed so that the F-spring 24 and B-spring 29 can sandwich the magnets 26 from the X-axis direction. In addition, it is preferable to sandwich an insulation sheet 30 among the F-spring 24, the magnet 26 and the magnet holding member 25. The cap 27 is fixed on the magnet holding member 25 through the F-spring 24 and the insulation sheet 30.

On inner circumference of the F-spring 24 and B-spring 29, a coil holder 22 supporting the AF coil (second driving coil) 23 is fixed, the AF coil 23 is sandwiched between the F-spring 24 and B-spring 29. The lens portion 21 is supported by the inner circumference of the coil holder 22. The lens portion 21 includes at least one lens, and forms an image by the image light on a light receiving surface of the image sensor 11 arranged at the Z-axis positive direction side of the lens portion 21.

The lens portion 21 is supported by the coil holder 22, and the coil holder 22 is fixed on the inner circumference of F-spring 24 and B-spring 29, and the outer circumference of these springs 24 and 29 is fixed on the magnet holding member 25. Therefore, inside the movable unit 20, the lens portion 21 is supported to allow a free movement relatively to the magnet holding member 25 along the Z-axis direction. The B-spring 29 and F-spring 24 are thin-plate springs and are configured with elastic materials so as to enable the movable unit 20 to make a free movement relatively along the light axis direction.

Especially, the F-spring 24 is preferably configured with elastic materials having conductive characteristics. Although a material configuring the F-spring 24 is not particularly limited, for example, metallic material such as copper, beryllium or alloys including thereof can be used. The inner circumferential portion of the F-spring 24 is electrically connected to the AF coil 23 fixed to the coil holder 22. Therefore, in this embodiment, it is capable to supply an electric power from the circuit board 32 or the image sensor base plate 10 to the AF coil 23 through the two of wire member 31 and the F-spring 24.

A driving force, that allows a movement of the lens portion 21 which is arranged in the movable unit 20 relatively to the Z-axis direction against the magnet holding member 25, is generated from an AF voice coil motor consisting of the coil 23 and the magnet 26. For example, by supplying a driving signal to the coil 23, a moving force of the Z-axis direction (a direction of a light axis L) generates to the coil 23 against the magnet 26.

More specifically, the lens portion 21 of the movable unit 20 functions as a lens for AF. In addition, as previously indicated, the movable unit 20 moves to the X-Y axis direction against the base plate 10. For this reason, the lens portion 21 of the movable unit 20 functions as a lens for a shake correction.

Moreover, although the AF coil 23 may be fixed to the lens portion 21, it is preferred to be fixed through a coil holder 22, as this embodiment. The coil holder 22 has a hollow cylindrical shape and includes a portion to fix the lens portion 21 and a portion to fix the AF coil 23. The AF coil 23 which is polygonal (octagonal) can be attached firmly to the cylindrical shape lens portion 21 by the coil holder 22.

As shown in FIGS. 1 and 2, the movable unit 20, which is supported to allow a free movement in the X-Y axis direction against the bracket 12 by the wire member 31, is contained in an inner casing 28a and it enables to move in the X-Y axis direction against the image sensor 11. A lower end of the inner casing 28a is fixed on the bracket 12 or the base plate 10. FIG. 4 shows a perspective view of the camera unit 2 which is before being covered by the inner casing 28a, and FIG. 6 shows a perspective view of the camera unit 2 which is after being covered by the inner casing 28a.

Figure 7:
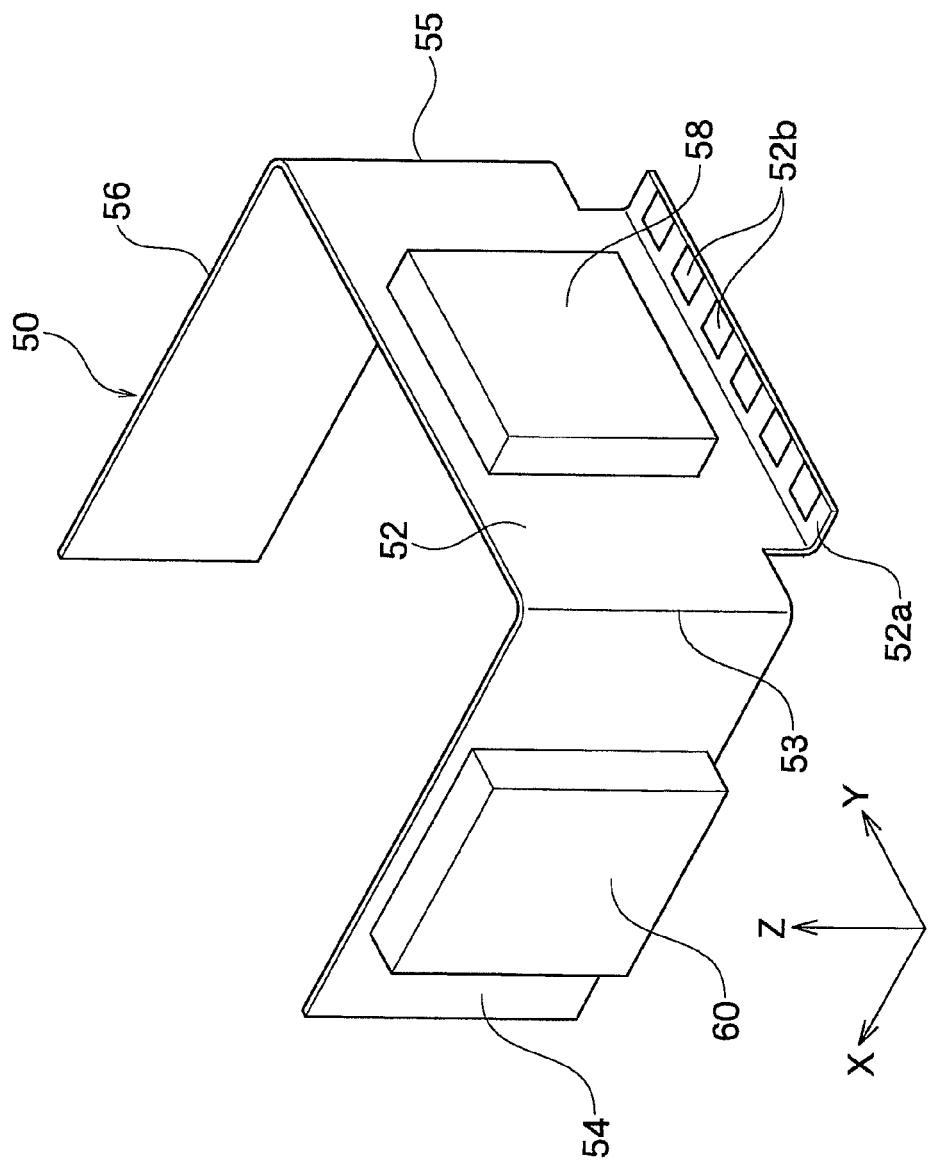
FIG. 7 is a perspective view of the flexible printed circuits shown in FIGS. 1, 2 and 6.
Figure 8:
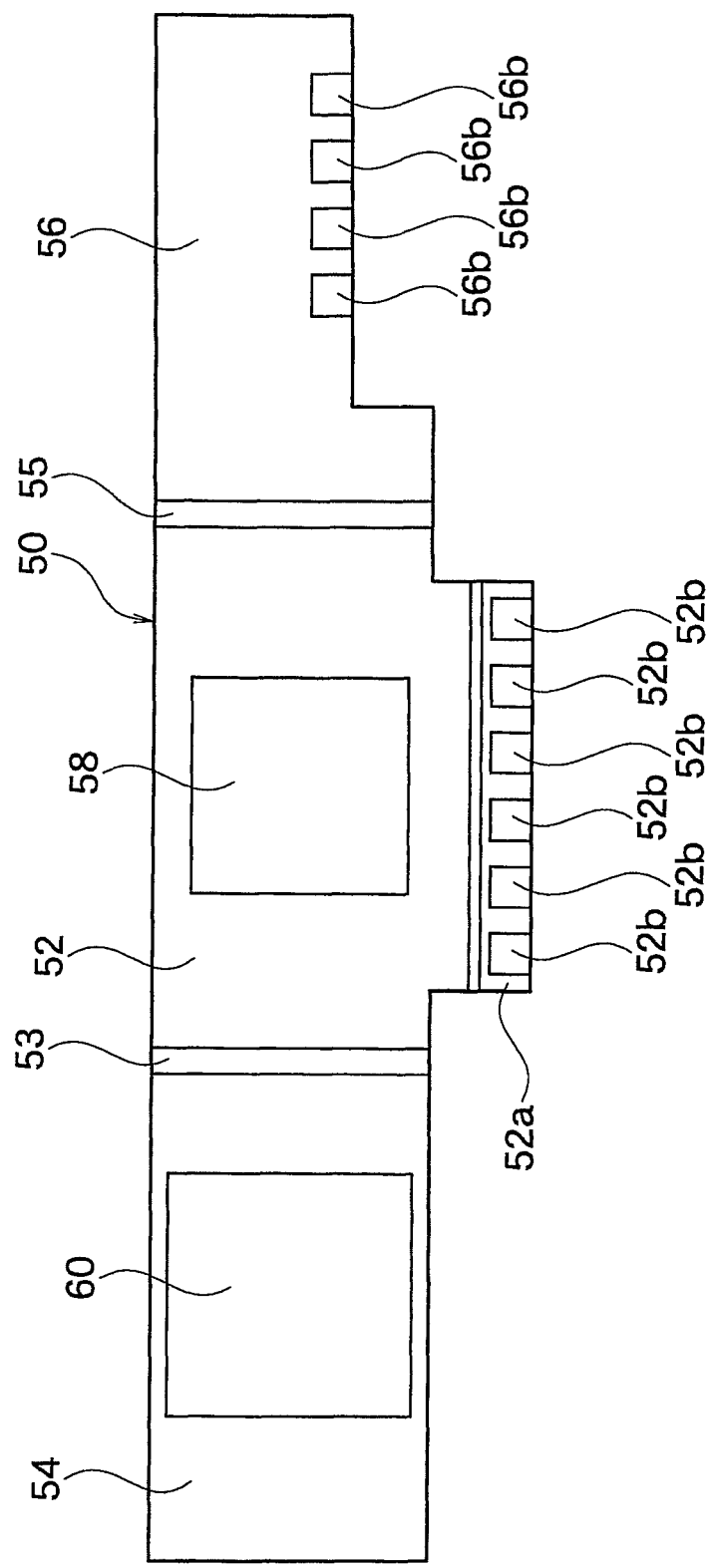
FIG. 8 is a plane development view of the flexible printed circuits shown in FIG. 7.

As shown in FIG. 6, a planar flexible printed circuit (FPC) 50 is attached by means of adhesion and the like in order to twine three outside wall surfaces which are adjacent parallel to the Z-axis direction on the inner casing 28a. As shown in FIGS. 7 and 8, the FPC 50 comprises a first lateral surface 52 on which an gyro sensor 58 as a shake detection sensor is attached and also a second lateral surface 54 on which a control integrated circuit (IC) 60 is attached, the second lateral surface 54 is continuously formed to enable a folding against the first lateral surface 52 around a folding line 53. On the lower end of the first lateral surface 52, a terminal strip 52a is integrally formed to enable a folding, and on the terminal strip 52a, a first terminal 52b is formed.

Moreover, at the opposite side of the connection between the first lateral surface 52 and the second lateral surface 54, the FPC 50 further comprises a third lateral surface 56 which is continuously formed with the first lateral surface 52 to enable a folding around a folding line 55. At lower end of the third lateral surface 56, a second terminal 56b is formed. A first terminal 52b and the second terminal 56b are connected to the gyro sensor 58 and/or the control IC 60 by an inner wire circuit of FPC.

Note that, a mounting position of the gyro sensor 58 and the control IC 60 is not limited to the embodiment as shown in Figures. For example, the mounting position of the gyro sensor 58 and the control IC 60 may be reversed. Moreover, the FPC 50 is configured only with the first lateral surface 52 and the second lateral surface 54, and the second terminal 56b may be formed on the lower end of the second lateral surface 54. Alternatively, the FPC 50 may be configured only with the first lateral surface 52.

As shown in FIGS. 1 and 6, a first terminal 52a of the FPC 50 is folded outward and the first terminal 52b is electrically connected to a joining terminal 10b2 which is formed on the outer circumferential surface of the image sensor base plate 10. Moreover, as shown in FIG. 1, the second terminal 56b of the FPC 50 is electrically connected to a joining terminal 32b of a distributing cable 32a which is formed on a circuit board 32 at fixed side. As a result of these connections, the gyro sensor 58 and the control IC 60 are connected to an inner wiring of the image sensor base plate 10 and/or an inner wiring of the circuit board 32 through the FPC 50.

As shown in FIGS. 1 and 2, at the external side of the inner casing 28a on which the FPC 50 is attached, an outer casing 28b is fixed on the base plate 10 and the camera unit 2 is completed.

The camera unit 2 according to this embodiment detects a position of the movable unit 20 or the lens portion 21, on a basis of a detected signal of the X-direction position sensor 35x and Y-direction position sensor 35y. The control IC 60 of the FPC 50 detects a position of the lens portion 21, and according to this, a shake correction action with high accuracy can be realized by transmitting a driving signal to the coils 36x and 36y and by driving the shake correction voice coil motor.

Moreover, in the camera unit 2 according to this embodiment, the magnet holding plate 34 is configured with a magnet body and it blocks magnetism between the magnets 37x and 37y included in the shake correction voice coil motor and the magnet 26 included in the AF voice coil motor so that each magnetic field can be prevented from interfering. By the blocking effect of the magnet holding plate 34 like this, it enables adjacently to locate the X-direction and the Y-direction shake correction magnets 37x and 37y and the AF magnet 26, and it is suitable for downsizing in view of this.

Moreover, in this embodiment, the AF magnet 26 is configured with four individual pieces of magnets arranged at positions corresponding to respective corners of the magnet holding plate 34. The AF coil 23 must be arranged at the inner circumferential side of the AF magnet 26. However, by arranging the AF magnet 26 at the corners, in this embodiment, it enables to include the lens portion 21 having a larger diameter and it is suitable for downsizing.

Moreover, in this embodiment, the X-direction and the Y-direction shake correction magnets 37x and 37y are configured with four rod-like magnets which are arranged at positions corresponding to respective sides of the magnet holding plate 34. Here, the X-direction and the Y-direction shake correction coils 36x and 36y are arranged not at an inner circumferential side but arranged in the Z-axis direction at predetermined interval, against the X-direction and the Y-direction shake correction magnets 37x and 37y.

Therefore, in this embodiment, it enables to increase a driving force by enlarging a facing area of the magnets 37x and 37y and the coils 36x and 36y in the shake correction voice coil motor, with maintaining the whole apparatus in a compact size. In this respect, it is suitable for downsizing. Moreover, since the shake correction voice coil motor causes a movement of the whole movable unit 20, it is preferable to have a larger driving force than that of the AF voice coil motor.

In addition, in this embodiment, the lens portion 21 is supported to allow a free movement in three axis (three dimensional) directions against the image sensor 11 by fixing the image sensor 11 to the base plate 10 (fixed portion). Moreover, in this embodiment, there is no need to connect between the movable unit and the fixed portion by FPC for transferring an image data, it enables a smooth movement of the movable unit 20 which is a movable portion against the image sensor 11, enables to reduce a noise signal caused by bending and the like of the FPC, and also enables to improve an accuracy of the shake correction control. Further, it becomes easy to assemble the camera unit 2 by fixing the image sensor 11 to the base portion 40 (fixed portion), and that contributes for reducing manufacturing cost.

Moreover, in this embodiment, the FPC 50 is attached so as to contact with the sidewall surface parallel to the light axis L of lens on the inner casing 28a which is fixed on the base plate 10 as a fixed portion, and the FPC 50 does not bend and extend in response to a movement of the movable unit 20 and is less likely to generate a noise. In addition, there is no need to connect between the movable unit 20 and the base plate 10 by the FPC 50 and it enables assembling the apparatus 2 easier.

Furthermore, in this embodiment, the gyro sensor 58 as a shake detection sensor is attached to the FPC 50 and the FPC 50 is attached at the outer circumferential surface of the inner casing 28a. Therefore, a vibration caused by a movement of the movable unit 20 is hard to be transmitted to the gyro sensor 58, and it enables the gyro sensor 58 to detect a shake with high accuracy. In this respect, a shake correction with high accuracy can be realized. In addition, it enables downsizing of apparatus since the FPC 50 is attached along the outer circumferential surface of the inner casing 28a. The FPC 50 may be fixed on the internal surface of the outer casing 28b or on the internal surface of the inner casing 28a.

Other Embodiments

In the above mentioned embodiment, although the shake correction voice coil motor moves the lens portion 21 and the AF voice coil motor 38, it is not limited thereto as for the lens driving apparatus according to the present invention. For example, a lens driving apparatus may cause the AF voice coil motor to move the lens portion 21 and the shake correction voice coil motor. Moreover, in the above mentioned embodiment, although the voice coil motor is applied as a driving portion to move the lens portion 21, a driving portion other than the voice coil motor may be applied. Note that, the present invention is not limited to the above mentioned embodiments, and it can be improved variously.

The invention claimed is:

1. A lens driving apparatus comprising:
   a lens portion having at least one lens,
   a first driving portion to cause a movement of a movable unit including said lens portion relatively to a fixed portion in the X-axis direction and the Y-axis direction along a vertical direction of a light axis of said lens portion,
   a second driving portion to cause a movement of said lens portion relatively to said fixed portion along said light axis, and
   an image sensor held on said fixed portion to detect a light which comes through said lens portion,
   a casing held on said fixed portion to cover said movable unit and the image sensor, and
   a planar flexible printed circuit to which the shake detection sensor detecting shake of said fixed portion is connected and fixed, the planar flexible printed circuit being attached to contact with a sidewall surface of said casing parallel to the light axis of said lens, wherein
   a fixed circuit board vertical to said light axis is arranged on said fixed portion,
   a sensor detecting a movement of said movable unit in the X-axis direction and the Y-axis direction is arranged on said fixed circuit board, and
   said flexible printed circuit and said fixed circuit board are connected,
   wherein, said movable unit is attached to allow a movement relatively to said fixed portion along the vertical direction of said light axis by at least three wire members, and said movable unit includes the second driving portion, and
   wherein, a driving power is supplied to the second driving portion of said movable unit through at least one of said wire members.

2. The lens driving apparatus as set forth in claim 1, wherein
   a control integrated circuit for shake control is held on said fixed portion.

3. The lens driving apparatus as set forth in claim 1, wherein
   said flexible printed circuit comprises a first terminal electrically connecting to an image sensor base plate which configures a part of said fixed portion with supporting said image sensor.

4. The lens driving apparatus as set forth in claim 1, wherein
   said first driving portion comprises a first driving coil applying a driving force to a first magnet, and
   said flexible printed circuit comprises a second terminal electrically connecting to a fixed circuit board which is a part of said fixed portion with supporting said first driving coil.

5. The lens driving apparatus as set forth in claim 1, wherein
   said second driving portion comprises a second driving coil applying a driving force to a second magnet,
   said second magnet is held on a magnet holding member of said movable unit,
   said second driving coil is held on a coil holder of said movable unit,
   said lens portion is held on said coil holder,
   said magnet holding member and coil holder is connected by a thin-plate spring, and
   said coil holder is supported to allow a free movement to the light axis direction against said magnet holding member.

6. The lens driving apparatus as set forth in claim 1, wherein
   said flexible printed circuit is attached along with more than two adjacent sidewall surfaces of said casing.

7. The lens driving apparatus as set forth in claim 6, wherein
- said flexible printed circuit comprises a first lateral surface on which said shake detection sensor is attached, and a second lateral surface on which a control integrated circuit is attached, the second lateral surface being continuously formed with the first lateral surface to enable a folding against said first lateral surface, and
- each said, first lateral surface and said second lateral surface are attached to the two adjacent sidewall surfaces of said casing.

8. The lens driving apparatus as set forth in claim 7, wherein
- said flexible printed circuit further comprises a third lateral surface which is continuously formed with the first lateral surface to enable a folding against said first lateral surface, at the opposite side of the connection between said first lateral surface and said second lateral surface.

\* \* \* \* \*